United States Patent
Lee et al.

(10) Patent No.: US 12,009,515 B2
(45) Date of Patent: Jun. 11, 2024

(54) NEGATIVE ELECTRODE ACTIVE MATERIAL FOR LITHIUM SECONDARY BATTERY AND PREPARATION METHOD THEREOF

(71) Applicant: LG CHEM, LTD., Seoul (KR)

(72) Inventors: Yong Ju Lee, Daejeon (KR); Rae Hwan Jo, Daejeon (KR); Su Min Lee, Daejeon (KR); Dong Hyuk Kim, Daejeon (KR); Se Mi Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 481 days.

(21) Appl. No.: 16/764,641

(22) PCT Filed: Nov. 22, 2018

(86) PCT No.: PCT/KR2018/014473
§ 371 (c)(1),
(2) Date: May 15, 2020

(87) PCT Pub. No.: WO2019/103499
PCT Pub. Date: May 31, 2019

(65) Prior Publication Data
US 2020/0403235 A1  Dec. 24, 2020

(30) Foreign Application Priority Data

Nov. 24, 2017 (KR) .................. 10-2017-0158624

(51) Int. Cl.
| | |
|---|---|
| *H01M 4/485* | (2010.01) |
| *C01B 33/22* | (2006.01) |
| *C01B 33/32* | (2006.01) |
| *H01M 4/02* | (2006.01) |
| *H01M 4/36* | (2006.01) |
| *H01M 4/62* | (2006.01) |
| *H01M 10/0525* | (2010.01) |

(52) U.S. Cl.
CPC ............. *H01M 4/485* (2013.01); *C01B 33/22* (2013.01); *C01B 33/32* (2013.01); *H01M 4/366* (2013.01); *H01M 4/625* (2013.01); *H01M 10/0525* (2013.01); *C01P 2002/02* (2013.01); *C01P 2004/80* (2013.01); *C01P 2006/40* (2013.01); *H01M 2004/027* (2013.01)

(58) Field of Classification Search
CPC ...... H01M 4/485; H01M 4/366; H01M 4/625; H01M 10/0525; H01M 2004/027; H01M 4/131; C01B 33/22; C01B 33/32; C01B 33/20; C01P 2002/02; C01P 2004/80; C01P 2006/40
See application file for complete search history.

(56) References Cited

U.S. PATENT DOCUMENTS

| | | |
|---|---|---|
| 2005/0233213 A1 | 10/2005 | Lee et al. |
| 2012/0037858 A1* | 2/2012 | Kim ............ H01M 4/134 252/519.1 |
| 2012/0326500 A1 | 12/2012 | Hirose et al. |
| 2014/0322606 A1 | 10/2014 | Lee et al. |
| 2016/0308205 A1 | 10/2016 | Canham et al. |
| 2017/0222222 A1 | 8/2017 | Lee et al. |
| 2018/0013142 A1 | 1/2018 | Kang et al. |
| 2018/0090750 A1 | 3/2018 | Oh et al. |
| 2018/0151868 A1 | 5/2018 | Kim et al. |
| 2018/0151873 A1 | 5/2018 | Matsuno et al. |
| 2018/0351172 A1 | 12/2018 | Hirose et al. |

FOREIGN PATENT DOCUMENTS

| | | | |
|---|---|---|---|
| CN | 102842707 A | | 12/2012 |
| CN | 103474632 A | * | 12/2013 |
| CN | 106356508 A | | 1/2017 |
| EP | 3136477 A1 | | 3/2017 |
| EP | 3306711 A1 | | 4/2018 |
| JP | 2003-192327 A | | 7/2003 |
| JP | 2010-170943 A | | 8/2010 |
| JP | 2012033317 A | * | 2/2012 |
| JP | 2017-130368 A | | 7/2017 |
| KR | 10-2005-0067147 A | | 8/2005 |
| KR | 20050087148 A | * | 8/2005 |
| KR | 10-2005-0090218 A | | 9/2005 |
| KR | 10-2014-0070482 A | | 6/2014 |
| KR | 10-1586816 B1 | | 1/2016 |
| KR | 10-2016-0040104 A | | 4/2016 |
| KR | 10-2016-0093632 A | | 8/2016 |
| KR | 10-2016-0125871 A | | 11/2016 |
| KR | 10-2016-0149862 A | | 12/2016 |
| KR | 10-2017-0036637 A | | 4/2017 |
| KR | 10-2017-0069951 A | | 6/2017 |
| WO | WO 2016/194288 A1 | | 12/2016 |

OTHER PUBLICATIONS

Extended European Search Report, dated Nov. 13. 2020, for European Application No. 18881108.7.
International Search Report issued in PCT/KR2018/014473 (PCT/ISA/210), dated Feb. 27, 2019.

* cited by examiner

*Primary Examiner* — Matthew T Martin
*Assistant Examiner* — Grace Ann Kenlaw
(74) *Attorney, Agent, or Firm* — Birch, Stewart, Kolasch & Birch, LLP

(57) ABSTRACT

A negative electrode active material for a lithium secondary battery, which includes a silicon-based particle represented by M-SiO$_x$, wherein M is Li, Mg, Ca, Al, or Ti, and 0≤x<2, wherein the M-SiO$_x$ includes an amorphous phase at 20 wt % to 70 wt % based upon a total weight of the M-SiO$_x$, thereby exhibiting excellent initial efficiency and lifespan characteristics, and a preparation method thereof.

8 Claims, No Drawings

NEGATIVE ELECTRODE ACTIVE MATERIAL FOR LITHIUM SECONDARY BATTERY AND PREPARATION METHOD THEREOF

CROSS-REFERENCE TO RELATED APPLICATION

This application claims priority to and the benefit of Korean Patent Application No. 10-2017-0158624, filed on Nov. 24, 2017, the disclosure of which is incorporated herein by reference in its entirety.

TECHNICAL FIELD

The present invention relates to a negative electrode active material for a lithium secondary battery comprising a silicon-based particle containing a metal and having certain content ranges of crystalline and amorphous phases of the silicon-based particle, thereby exhibiting excellent lifespan performance and initial efficiency, and a preparation method thereof.

BACKGROUND ART

With a rapid increase in the use of fossil fuels, there is an increasing demand for the use of alternative energy or clean energy. The field of electricity generation and accumulation using an electrochemical reaction has been most actively studied to meet the increasing demand.

As a representative example of electrochemical devices using such electrochemical energy, secondary batteries are currently used, and an application area thereof has gradually been increased. Recently, with an increase in development of technology and demand for portable devices, such as portable computers, mobile phones, cameras, and the like, demand for secondary batteries as energy sources is rapidly increasing. Among such secondary batteries, much research has been conducted on high energy density, that is, high capacity lithium secondary batteries, and such lithium secondary batteries are commercially available and widely used.

Generally, a secondary battery is composed of a positive electrode, a negative electrode, an electrolyte, and a separator. The negative electrode includes a negative electrode active material in which lithium ions exiting the positive electrode are intercalated and deintercalated, and as the negative electrode active material, silicon-based particles having a large discharge capacity may be used. However, silicon-based particles, such as $SiO_x$ ($0 \le x < 2$), have low initial efficiency, and a volume thereof changes excessively in a charging and discharging process. Thus, there is a limitation in that lifetime of the battery is reduced.

In order to address this limitation, a $SiO_2$ layer or a carbon coating layer was typically formed on a surface of the silicon-based particle. However, even if the above method is used, since volume control is not smooth as charge and discharge cycles of the battery proceed, efficiency may be reduced. Korean Patent Application Laid-open Publication No. 10-2016-0149862 discloses that a volume change is further controlled by additionally disposing a polymer composite on the carbon coating layer.

However, even if the polymer composite is used, the control of the volume change may not be easy, resistance may be increased due to a decrease in conductivity of the active material, and capacity retention of the battery may be reduced. Also, since the silicon-based particle is excessively coated, absorption of lithium ions is not easy, and thus, capacity may be reduced.

Accordingly, there is a need for the development of a negative electrode active material capable of exhibiting excellent lifespan characteristics by effectively controlling a volume change in a charging and discharging process ofa secondary battery, and exhibiting excellent initial efficiency by minimizing internal structural changes such as the grain size of Si.

DISCLOSURE OF THE INVENTION

Technical Problem

It is an aspect of the present invention to provide a negative electrode active material for a lithium secondary battery exhibiting improved initial efficiency by minimizing internal structural changes, such as the grain size of Si, and having excellent lifespan characteristics.

It is another aspect of the present invention to provide a method of preparing the negative electrode active material for a lithium secondary battery.

It is still another aspect of the present invention to provide a secondary battery comprising the negative electrode.

Technical Solution

One aspect of the present invention provides a negative electrode active material for a lithium secondary battery comprising a silicon-based particle represented by M-$SiO_x$ (where M is Li, Mg, Ca, Al, or Ti, and, $0 \le x < 2$), wherein the M-$SiO_x$ includes a crystalline phase and an amorphous phase, and includes the amorphous phase at 20 wt % to 70 wt % based upon a total weight of the M-$SiO_x$.

Another aspect of the present invention provides a method of preparing the negative electrode active material comprising 1) vacuum-heating a powder mixture of Si and $SiO_2$ to form $SiO_x$ ($0 \le x < 2$) vapor, 2) vacuum-heating a metal M (where M is Li, Mg, Ca, Al, or Ti) to form M vapor, and 3) mixing the $SiO_x$ ($0 \le x < 2$) vapor and the M vapor and solid-phase condensing the mixture of $SiO_x$ vapor and M vapor, wherein the solid-phase condensing process includes controlling the temperature to adjust an amorphous phase content of the M-$SiO_x$ to the range of 20 wt % to 70 wt % based upon a total weight of the M-$SiO_x$.

Still another aspect of the present invention provides a secondary battery comprising the negative electrode.

Advantageous Effects

A negative electrode active material according to the present invention includes a silicon-based particle containing Li, Mg, Ca, Al, or Ti such that the Li, Mg, Ca, Al, or Ti reacts first with silicon oxide of the silicon-based particle to minimize internal structural changes, such as the grain size of silicon, and reduce an initial irreversible reaction between lithium and oxygen in the silicon-based particle at the time of initial charging, thereby exhibiting excellent initial efficiency and lifespan characteristics.

MODE FOR CARRYING OUT THE INVENTION

Hereinafter, the present invention will be described in detail in order to facilitate understanding of the present invention.

The terms or words used in the present specification and claims should not be construed as being limited to ordinary or dictionary meanings and should be construed as meanings and concepts consistent with the spirit of the present invention based on the principle that an inventor can appropriately define concepts and terms to explain the invention of the inventor in the best way.

The terminology provided herein is merely used for the purpose of describing particular embodiments, and is not intended to be limiting of exemplary embodiments of the present invention. The singular forms "a" and "an" are intended to include the plural forms as well, unless the context clearly indicates otherwise.

It should be understood that the terms "comprises," "comprising," "includes," "comprising," "has," and/or "having," when used herein, specify the presence of stated features, integers, steps, operations, elements, components and/or combinations thereof, but do not preclude the presence or addition of one or more other features, integers, steps, operations, elements, components and/or combinations thereof.

A negative electrode active material for a lithium secondary battery of the present invention includes silicon-based particles represented by M-SiO$_x$ (where M is Li, Mg, Ca, Al, or Ti, and, 0≤x<2), and the M-SiO$_x$ includes a crystalline phase and an amorphous phase, and includes the amorphous phase at 20 wt % to 70 wt % based upon a total weight of the M-SiO$_x$.

The silicon-based particle may include SiO$_x$ (0≤x<2), and the SiO$_x$ (0≤x<2) may have a form in which Si and SiO$_2$ are included. That is, x corresponds to a number fraction of O with respect to Si included in the SiO$_x$ (0≤x<2). When the negative electrode active material includes SiO$_x$ (0≤x<2), the discharge capacity of the secondary battery may be improved.

An average particle diameter D$_{50}$ of the silicon-based particles may be in the range of 0.1 μm to 20 μm, and specifically, in the range of 0.5 μm to 10 μm. When the silicon-based particles satisfy the above-described average particle diameter range of 0.1 μm to 20 μm, side reactions with an electrolyte are suppressed, and oxidation of a core is controlled, thereby preventing a deterioration in initial efficiency.

In the present specification, the average particle diameter D$_{50}$ may be defined as a particle diameter on the basis of 50% of a particle diameter distribution of particles. The average particle diameter D$_{50}$ may be measured using, for example, a laser diffraction method. In the laser diffraction method, particle diameters ranging from a submicron range to several millimeters can be measured, and high reproducibility and high resolvability may be obtained.

The silicon-based particles are represented by M-SiO$_x$ (0≤x<2), which represent a form in which a metal that may be represented by M, specifically Li, Mg, Ca, Al, or Ti, is doped or included and bonded to SiO$_x$.

The M-SiO$_x$ may include an amorphous phase at 20 wt % to 70 wt % based upon a total weight of the M-SiO$_x$, specifically, at 25 wt % to 65 wt %, and more specifically, at 30 wt % to 60 wt %, and the amorphous phase may include Si, SiO$_2$, or both thereof.

When the M-SiO$_x$ includes the amorphous phase in the above-described range of 20 wt % to 70 wt %, excellent lifespan performance and initial efficiency may be exhibited. When a content of the amorphous phase is less than the above-described range of 20 wt % to 70 wt %, crystallinity may be excessive and thus lifespan characteristics may be deteriorated. When the content of the amorphous phase exceeds the above-described range of 20 wt % to 70 wt %, an effect of improving the initial efficiency may be insufficient due to insufficient bonding between the metal represented by M and oxygen.

The M-SiO$_x$ may include a crystalline phase in addition to the amorphous phase. The crystalline phase may include one or more selected from the group consisting of a Si phase, a SiO$_2$ phase, a metal oxide phase, and a metal silicate phase.

The Si phase may be present in the silicon-based particle in a crystalline form having a particle size with a nanometer size diameter. The crystalline Si phase may have a particle size with an average particle diameter ranging from 1 nm to 70 nm, and specifically, 3 nm to 50 nm.

The lithium secondary battery of one embodiment of the present invention may be prepared by a process including forming SiO$_x$ vapor by vacuum-heating a mixed powder of Si and SiO$_2$, and a process of mixing and reacting the SiO$_x$ vapor and vapor of the metal M (Li, Mg, Ca, Al, or Ti) to condense into a solid-phase, and oxygen in the SiO$_x$ vapor reacts and binds to the metal M vapor to form a metal oxide (M$_{x'}$O$_{y'}$) and a metal silicate (M$_{x''}$Si$_{y''}$O$_z$) (where x', x", y', y", and z are determined according to an oxidation number of M). Specifically, Si is crystallized inside the SiO$_x$, and the metal oxide and the metal silicate are formed. Here, the degree of crystallization of the Si, the metal oxide, and the metal silicate changes depending on a condensation condition, and thus the amount of the amorphous phase remaining in the M-SiO$_x$ is changed.

In one embodiment of the present invention, the metal silicate may be formed by combining Li or Mg with SiO$_2$.

In the negative electrode active material for a lithium secondary battery according to one embodiment of the present invention, the silicon-based particle may include a Si phase, a SiO$_x$ phase, a M$_{x'}$O$_{y'}$ phase, a M$_{x''}$Si$_{y''}$O$_z$ phase, and a SiO$_2$ phase, each of which can intercalate and deintercalate lithium.

The silicon-based particles may include M at 1 wt % to 40 wt %, specifically, 7 wt % to 30 wt %, more specifically, 10 wt % to 30 wt %, and even more specifically 10 wt % to 20 wt % based on the total weight of the silicon-based particles. When the content of M in the silicon-based particles satisfies the above-described range of 1 wt % to 40 wt %, the initial efficiency of the negative electrode active material may be further improved, and at the same time, excellent lifespan characteristics may be exhibited.

Meanwhile, the silicon-based particle may further include a carbon coating layer on a surface of the silicon-based particle. The carbon coating layer may cover at least a part of the surface of the silicon-based particle, and may cover the entire surface of the core. Due to the carbon coating layer, excessive expansion of the volume of the silicon-based particle may be more effectively controlled in the charging and discharging process of the battery, and the conductivity of the negative electrode active material may be increased so that the resistance of the negative electrode may be further reduced. Further, when the carbon coating layer is included, surface hardness of the silicon-based particle may be further increased, and the electrical conductivity of the silicon-based particle may be improved so that uniform charging and discharging is enabled, thereby more effectively controlling the volume changes during charging and discharging.

The silicon-based particle may include the carbon coating layer on the surface of the silicon-based particle in an amount of 1 wt % to 30 wt %, specifically, 2 wt % to 10 wt %, and more specifically, 4 wt % to 6 wt % based on the total weight of the negative electrode active material for a lithium secondary battery. When the carbon coating layer satisfies the above-described range of 1 wt % to 30 wt %, the electrical conductivity of the silicon-based particles may be improved so that uniform charging and discharging may be enabled, thereby more effectively controlling the volume changes during charging and discharging.

The thickness of the carbon coating layer may be in the range of 1 nm to 200 nm, and specifically, in the range of 5 nm to 100 nm. When the above-described range of 1 nm to 200 nm is satisfied, the electrical conductivity of the negative electrode may be improved while conductive paths in the negative electrode active material are maintained.

The weight ratio of the silicon-based particles to the carbon coating layer may be 99:1 to 70:30, and specifically, 98:2 to 90:10. When the above-described weight ratio of 99:1 to 70:30 is satisfied, the volume changes of the silicon-based particles may be more effectively controlled, and the conductivity of the negative electrode active material may be further improved.

The present invention provides a method of preparing a negative electrode active material.

The method of preparing a negative electrode active material represented by M-SiO$_x$ of one embodiment of the present invention includes 1) vacuum-heating a powder mixture Si and SiO$_2$ to form SiO$_x$ vapor; 2) vacuum-heating a metal M to form M vapor; and 3) mixing the SiO$_x$ vapor and the M vapor and solid-phase condensing the mixture of SiO$_x$ vapor and the M vapor, and the solid-phase condensing process includes controlling a temperature to adjust an amorphous content range of the M-SiO$_x$ to 20 wt % to 70 wt % based upon a total weight of the M-SiO$_x$(where M is Li, Mg, Ca, Al, or Ti, and 0≤x<2).

In the process 1), Si and SiO$_2$ may be mixed in a molar ratio of 0.8:1.2 to 1.2:0.8, specifically, 0.9:1.1 to 1.1:0.9, and more specifically, 1:1, and the SiO$_x$ (0≤x<2) vapor is formed through the step of vacuum-heating.

The step of vacuum-heating in the process 1) may be performed at 1,200° C. to 1,800° C., specifically, 1,250° C. to 1,700° C., and more specifically, 1,300° C. to 1,500° C. When the vacuum-heating temperature satisfies the above-described range of 1,200° C. to 1,800° C., the mixture of Si and SiO$_2$ may appropriately form SiO$_x$ (0≤x<2).

In the process 2), the metal M is vacuum-heated to form the M vapor. The metal M may be one or more selected from the group consisting of Li, Mg, Ca, Al, and Ti, and when the M vapor has two or more types, each type of vapor may be prepared through a separate process. Further, when the M vapor has two or more types, each metal M may be heated in different temperature ranges.

In the process 2), the vacuum-heating may be performed at 700° C. to 1,600° C., specifically, 800° C. to 1,500° C., and more specifically, 900° C. to 1,400° C. When the vacuum-heating temperature satisfies the above-described range of 700° C. to 1,600° C., the metal M may be appropriately changed into a vapor form.

In the process (3), the SiO$_x$ vapor and the M vapor are mixed and solid-phase condensed. The SiO$_x$ vapor and the M vapor are mixed and reacted to form M-SiO$_x$. The mixing and solid-phase condensation may be performed in a temperature-controlled cooling zone, and in particular, the solid-phase condensation in the process 3) may be performed at 340° C. to 810° C., specifically, 350° C. to 800° C., and more specifically, at 400° C. to 750° C.

The crystalline and amorphous contents of the silicon-based particles may be controlled according to the solid-phase condensation temperature in the process 3). Specifically, when the solid-phase condensation temperature satisfies the above-described range of 340° C. to 810° C., the negative electrode active material satisfying the weight ratio of the crystalline and amorphous phases suggested in the negative electrode active material of the present invention may be prepared, and excellent initial efficiency and lifespan characteristics may be exhibited. When the solid-phase condensation temperature is lower than the above-described range of 340° C. to 810° C., the amorphous content becomes too great such that the initial efficiency is lowered, and when the solid-phase condensation temperature is higher than the above-described range of 340° C. to 810° C., the amorphous content is excessively reduced so that the lifespan characteristics are deteriorated.

The preparation method of the present invention may further include a step of forming a carbon coating layer on a surface of the negative electrode active material represented by M-SiO$_x$ after the process 3). The carbon coating layer may be formed by carbonizing a carbon precursor constituting the carbon coating layer. For example, the carbon coating layer may be formed through a chemical vapor deposition (CVD) method of a carbon precursor gas.

Further, one embodiment of the present invention provides a negative electrode including the above-described negative electrode active material. The negative electrode may include a current collector and a negative electrode active material layer disposed on the current collector. The negative electrode active material layer may include the negative electrode active material, and may further include a graphite-based active material in addition to the negative electrode active material. Further, the negative electrode active material layer may further include a binder and/or a conductive material.

When the graphite-based active material is used together with the negative electrode active material, charge and discharge characteristics of the battery may be improved. The graphite-based active material may be one or more selected from the group consisting of graphite, such as artificial graphite and natural graphite, graphitized carbon fibers, and graphitized meso-carbon microbeads.

The current collector is not particularly limited as long as it has conductivity without causing adverse chemical changes in the battery. Examples of the current collector include copper, stainless steel, aluminum, nickel, titanium, calcined carbon, or aluminum or stainless steel whose surface is treated with carbon, nickel, titanium, silver, or the like. Specifically, a transition metal that adsorbs carbon such as copper or nickel may be used as the current collector. The current collector may have a thickness of 6 μm to 20 μm, but the thickness of the current collector is not limited thereto.

The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomers (EPDMs), sulfonated EPDMs, styrene-butadiene rubber (SBR), fluorine rubber, polyacrylic acid, and materials obtained by substituting hydrogen of the aforementioned materials with Li, Na, Ca, or the like, and may include various copolymers thereof.

The conductive material is not particularly limited as long as it does not cause a chemical change in the battery and has conductivity. For example, graphite, such as natural graphite, artificial graphite or the like; a carbon black, such as carbon black, acetylene black, Ketjen black, channel black, furnace black, lamp black, thermal black or the like; a conductive fiber, such as a carbon fiber, a metallic fiber or the like; a conductive tube, such as carbon nanotubes or the like; metallic powder, such as carbon fluoride powder, aluminum powder, nickel powder or the like; a conductive whisker, such as zinc oxide, potassium titanate or the like; a conductive metal oxide, such as titanium oxide or the like; or a conductive material, such as a polyphenylene derivative or the like may be used as the conductive material.

Further, one embodiment of the present invention provides a secondary battery including the above-described negative electrode. The secondary battery may include the negative electrode, a positive electrode, a separator interposed between the negative electrode and the positive electrode, and an electrolyte. Since the negative electrode has been described above, a detailed description thereof will be omitted.

The positive electrode may include a positive electrode current collector, and a positive electrode active material layer formed on the positive electrode current collector and including a positive electrode active material.

In the positive electrode, the positive electrode current collector is not particularly limited as long as it does not cause a chemical change in the battery and has conductivity. For example, stainless steel, aluminum, nickel, titanium, calcined carbon, or aluminum or stainless steel whose surface is treated with carbon, nickel, titanium, silver or the like may be used as the positive electrode current collector. In addition, the positive electrode current collector may conventionally have a thickness of 3 μm to 500 μm, and the adhesive strength of the positive electrode active material may be increased by forming fine irregularities on the surface of the current collector. For example, a positive electrode current collector in various forms, such as a film, a sheet, a foil, a net, a porous body, a foamed body, and a non-woven fabric may be used.

Examples of the positive electrode active material may include, but are not limited to, a layered compound, such as a lithium cobalt oxide ($LiCoO_2$), a lithium nickel oxide ($LiNiO_2$), $Li[Ni_aCo_bMn_cM^1_d]O_2$ (where $M^1$ is any one or a combination of two or more elements selected from the group consisting of Al, Ga, and In, and $0.3 \leq a < 1.0$, $0 \leq b \leq 0.5$, $0 \leq c \leq 0.5$, $0 \leq d \leq 0.1$, $a+b+c+d=1$), $Li(Li_eM^2_{f-e-f}M^3_f)O_{2-g}A_g$ (where $0 \leq e \leq 0.2$, $0.6 \leq f \leq 1$, $0 \leq f' \leq 0.2$, $0 \leq g \leq 0.2$, and $M^2$ includes Mn and one or more selected from the group consisting of Ni, Co, Fe, Cr, V, Cu, Zn, and Ti, $M^3$ is one or more selected from the group consisting of Al, Mg, and B, and A is one or more selected from the group consisting of P, F, S, and N)), or the like, or a compound substituted with one or more transition metals; a lithium manganese oxide, such as $Li_{1+h}Mn_{2-h}O_4$ (where $0 \leq h \leq 0.33$), $LiMnO_3$, $LiMn_2O_3$, or $LiMnO_2$; a lithium copper oxide ($Li_2CuO_2$); a vanadium oxide, such as $LiV_3O_8$, $V_2O_5$, or $Cu_2V_2O_7$; a Ni-site type lithium nickel oxide represented by $LiNi_{1-i}M^4_iO_2$ (where $M^4$ is Co, Mn, Al, Cu, Fe, Mg, B, or Ga, and $0.01 \leq i \leq 0.3$); a lithium manganese composite oxide represented by $LiMn_{2-j}M^5_jO_2$ (where $M^5$ is Co, Ni, Fe, Cr, Zn, or Ta, and $0.01 \leq j \leq 0.1$) or $Li_2Mn_3M^6O_8$ (where $M^6$ is Fe, Co, Ni, Cu, or Zn); $LiMn_2O_4$ in which some Li ions in the chemical formula are substituted with alkaline earth metal ions; a disulfide compound; $LiFe_3O_4$ and $Fe_2(MoO_4)_3$, or the like.

The positive electrode active material layer may include a positive electrode conductive material and a positive electrode binder in addition to the above-described positive electrode active material.

Here, the positive electrode conductive material is a component for imparting conductivity to the electrode and is not particularly limited as long a sit does not cause a chemical change in the battery and has electronic conductivity. Specific examples of the positive electrode conductive material may include graphite, such as natural or artificial graphite; a carbon-based material, such as carbon black, acetylene black, Ketjen black, channel black, furnace black, lamp black, thermal black, or carbon fiber; a metal powder or metal fiber formed of copper, nickel, aluminum or silver; a conductive whisker, such as zinc oxide or potassium titanate; a conductive metal oxide, such as titanium oxide; or a conductive polymer, such as a polyphenylene derivative, which may be used alone or in a mixture of two or more thereof.

In addition, the positive electrode binder may serve to improve cohesion between positive electrode active material particles and adhesion between the positive electrode active material and the positive electrode current collector. Specific examples of the positive electrode binder may include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, ethylene-propylene-diene monomer (EPDMs), sulfonated-EPDMs, styrene butadiene rubber (SBR), fluoro rubber, and various copolymers thereof, which may be used alone or in a mixture of two or more thereof.

The separator may serve to separate a negative electrode and a positive electrode and provide a transporting passage for lithium ions, and is not particularly limited as long as it is used as a separator in a common secondary battery, and particularly, a separator which exhibits low resistance to migration of electrolyte ions and has an excellent ability of absorbing an electrolyte is preferable. Specifically, a porous polymer film, for example, a porous polymer film prepared of a polyolefin-based polymer, such as an ethylene homopolymer, a propylene homopolymer, an ethylene/butene copolymer, an ethylene/hexene copolymer and an ethylene/methacrylate copolymer, or a laminated structure having two or more layers thereof, may be used. In addition, as the separator, a conventional porous non-woven fabric, for example, a glass fiber with a high melting point or a polyethylene terephthalate fiber, may be used. Also, in order to ensure heat resistance or mechanical strength, a coated separator including ceramic components or polymer materials may be used, and the separator may have a single-layer or multi-layer structure.

The electrolyte may be an organic liquid electrolyte, an inorganic liquid electrolyte, a solid polymer electrolyte, a gel-type polymer electrolyte, an inorganic solid electrolyte, a molten-type inorganic electrolyte or the like, which may be used in the manufacture of a lithium secondary battery, but the present invention is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, fluoroethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, a phosphoric acid triester, trimethoxymethane, a dioxolane derivative, sulfolane, methylsulfolane, 1,3-dimethyl-2-imidazolidinone, a propylene carbonate derivative, a tetrahydrofuran derivative, ether, methyl propionate, ethyl propionate, or the like may be used.

Particularly, among the carbonate-based organic solvents, ethylene carbonate and propylene carbonate, which are cyclic carbonate compounds, are preferably used because they are high-viscosity organic solvents and dissociate a lithium salt effectively due to their high dielectric constant. It may be more preferable that such a cyclic carbonate compound is used in combination with a linear carbonate compound having low viscosity and a low dielectric constant such as dimethyl carbonate and diethyl carbonate in an appropriate ratio because an electrolyte having high electric conductivity may be formed.

A lithium salt may be used as the metal salt, and the lithium salt is a material that is readily soluble in the non-aqueous electrolyte. For example, the lithium salt may include, as an anion, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In addition to the electrolyte components, for the purpose of improving lifespan characteristics of the battery, suppressing a decrease in battery capacity, improving discharge capacity of the battery and the like, the electrolyte may further include one or more additives such as a haloalkylene carbonate-based compound such as difluoroethylene carbonate or the like, pyridine, triethyl phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethylene glycol dialkyl ethers, ammonium salts, pyrrole, 2-methoxyethanol, vinylene carbonate (VC), propane sultone (PS) or aluminum trichloride, and the like.

According to another embodiment of the present invention, a battery module is provided including the secondary battery as a unit cell and a battery pack including the same. Since the battery module and the battery pack include the secondary battery having high capacity, excellent rate performance, and excellent cycle characteristics, the battery pack may be used as a power source for medium- to large-sized devices selected from the group consisting of an electric vehicle, a hybrid electric vehicle, a plug-in hybrid electric vehicle, and a power storage system.

BEST MODE FOR CARRYING OUT THE INVENTION

EXAMPLES

Hereinafter, preferred embodiments are shown to facilitate understanding of the present invention, but it will be apparent to those skilled in the art that the embodiments are merely illustrative of the present invention and various changes and modifications can be made within the scope and technical concept of the present invention, and such changes and modifications are, of course, within the scope of the appended claims.

Example 1: Preparation of Negative Electrode Active Material

A powder of Si and $SiO_2$ mixed in a molar ratio of 1:1 was vacuum-heated at 1400° C. to form SiO vapor. Further, Li was vacuum-heated at 190° C. to form Li vapor.

The SiO vapor and the Li vapor were mixed at a weight ratio of 99:1 and reacted in a cooling zone at 500° C. to prepare Li—SiO condensed into a solid phase, which was ground using a ball mill to prepare a powder having an average particle diameter of 5 μm.

A carbon coating layer of 5 wt % based on the total weight of a negative electrode active material was formed on a surface of the powder by chemical vapor deposition (750° C.) using ethylene gas to prepare the negative electrode active material.

Examples 2 to 26 and Comparative Examples 1 to 4: Preparation of Negative Electrode Active Material As shown in Table 1 below, Li—SiO or Mg—SiO was prepared and a carbon coating layer was formed in the same manner as in Example 1 to prepare a negative electrode active material, except that at least one of a type of doping element M, a weight ratio of SiO vapor and doping element M vapor, an evaporation temperature of a mixed powder of Si and $SiO_2$, a vacuum-heating temperature of doping element M, a solid-phase condensation temperature, and a carbon coating layer content was changed in each of the examples and the comparative examples.

TABLE 1

| | M (Li or Mg) | Weight ratio (SiO:M) | Evaporation temperature (Mixed powder of Si and $SiO_2$) (° C.) | Vacuum-heating temperature (M) (° C.) | Solid-phase condensation temperature (° C.) | Content of carbon coating layer (wt %) |
|---|---|---|---|---|---|---|
| Example 1 | Li | 99:1 | 1,400 | 190 | 500 | 4 |
| Example 2 | Li | 98:2 | 1,400 | 195 | 500 | 5 |
| Example 3 | Li | 97:3 | 1,400 | 198 | 500 | 4 |
| Example 4 | Li | 90:10 | 1,420 | 205 | 500 | 4 |
| Example 5 | Li | 80:20 | 1,450 | 210 | 500 | 5 |
| Example 6 | Li | 70:30 | 1,480 | 220 | 500 | 5 |
| Example 7 | Mg | 99:1 | 1,400 | 670 | 500 | 5 |
| Example 8 | Mg | 98:2 | 1,400 | 680 | 500 | 4 |
| Example 9 | Mg | 97:3 | 1,400 | 690 | 500 | 4 |
| Example 10 | Mg | 90:10 | 1,420 | 705 | 500 | 5 |
| Example 11 | Mg | 80:20 | 1,450 | 730 | 500 | 5 |
| Example 12 | Mg | 70:30 | 1,480 | 755 | 500 | 5 |
| Example 13 | Li | 90:10 | 1,420 | 205 | 350 | 4 |
| Example 14 | Li | 90:10 | 1,420 | 205 | 400 | 5 |
| Example 15 | Li | 90:10 | 1,420 | 205 | 450 | 4 |
| Example 16 | Li | 90:10 | 1,420 | 205 | 550 | 5 |
| Example 17 | Li | 90:10 | 1,420 | 205 | 600 | 5 |
| Example 18 | Li | 90:10 | 1,420 | 205 | 750 | 4 |
| Example 19 | Li | 90:10 | 1,420 | 205 | 800 | 4 |
| Example 20 | Mg | 90:10 | 1,420 | 705 | 350 | 5 |
| Example 21 | Mg | 90:10 | 1,420 | 705 | 400 | 5 |
| Example 22 | Mg | 90:10 | 1,420 | 705 | 450 | 6 |
| Example 23 | Mg | 90:10 | 1,420 | 705 | 550 | 4 |
| Example 24 | Mg | 90:10 | 1,420 | 705 | 600 | 6 |
| Example 25 | Mg | 90:10 | 1,420 | 705 | 750 | 6 |
| Example 26 | Mg | 90:10 | 1,420 | 705 | 800 | 5 |
| Comparative Example 1 | Li | 90:10 | 1,420 | 205 | 320 | 5 |
| Comparative Example 2 | Li | 90:10 | 1,420 | 205 | 850 | 6 |
| Comparative Example 3 | Mg | 90:10 | 1,420 | 705 | 310 | 4 |
| Comparative Example 4 | Mg | 90:10 | 1,420 | 705 | 840 | 4 |

Experimental Example 1: Measurement of Amorphous Content

The amount of amorphous M-SiO$_x$ included in the negative electrode active material prepared in each of Examples 1 to 26 and Comparative Examples 1 to 4 was analyzed by a spiking method. The spiking method is a method of quantitatively analyzing the proportion of an amorphous portion of a sample to be analyzed by performing an X-ray diffraction (XRD) analysis after mixing a certain percentage of a reference material with very good crystallinity with a material to be analyzed.

10 wt % of a reference material was mixed in the negative electrode active material powder prepared in each of Examples 1 to 26 and Comparative Examples 1 to 4, and then, the mixture was uniformly mixed in a mortar, and XRD measurement was performed. The apparatus used in this experimental example is Bruker AXS D4 Endeavor XRD, and the voltage and current at the time of measurement are 40 kV and 40 mA, and Cu K radiation (wavelength: 1.54 Å) and a LynxEye position sensitive detector (3.7 slit) were used. Thereafter, a Rietveld analysis was performed to accurately determine a fraction of a crystalline phase and a reference material present in the material, and then a fraction of an amorphous phase was determined therefrom.

When the negative electrode active material powder to be analyzed was Li—SiO, MgO was used as the reference material, and when the negative electrode active material powder to be analyzed was Mg—SiO, Y$_2$O$_3$ was used as the reference material.

Experimental Example 2: Evaluation of Initial Efficiency

<Preparation of Secondary Battery>

A negative electrode slurry was prepared by mixing the negative electrode active material prepared in each of Examples 1 to 26 and Comparative Examples 1 to 4, Super-C65 as a conductive material, and lithium-substituted polyacrylic acid (Li-PAA) as a binder in water as a solvent at a weight ratio of 80:10:10. The prepared negative electrode slurry was applied to a copper (Cu) thin film as a negative electrode current collector having a thickness of about 65 μm, and dried, and then roll pressed to prepare a negative electrode.

A polypropylene separator was interposed between each of the prepared negative electrodes and lithium metal as a counter electrode, and then an electrolyte was injected to manufacture a half cell, wherein the electrolyte was prepared by dissolving 1M LiPF$_6$ in a solvent mixture prepared by adding 1 wt % of vinylene carbonate (VC) and 0.5 wt % of propane sultone (PS) in a solvent in which fluoroethylene carbonate (FEC), ethylene carbonate (EC), and ethyl methyl carbonate (EMC) were mixed at a volume ratio of 10:20:70.

<Initial Efficiency Evaluation>

Each of the half-cells manufactured using the negative electrodes prepared in Examples 1 to 26 and Comparative Examples 1 to 4 was charged and discharged to evaluate the initial efficiency and the results are shown in Table 2 below.

Each manufactured battery was charged at a constant current (CC) of 0.1 C at 25° C. until the voltage reached 5 mV, and then, first charging was performed at a constant voltage (CV) until the charging current reached 0.005 C (cut-off current). Afterward, each battery was allowed to stand for 20 minutes and discharged at a constant current (CC) of 0.1 C until the voltage reached 1.5 V to confirm the initial efficiency.

Experimental Example 3: Evaluation of Lifespan Characteristics

<Preparation of Secondary Battery>

The negative electrode active material prepared in each of Examples 1 to 26 and Comparative Examples 1 to 4 was mixed with natural graphite having a capacity of 355 mAh/g such that the mixture has a capacity of 500 mAh/g.

The mixture mixed at the capacity of 500 mAh/g, Super-C 65, carboxymethylcellulose (CMC), and styrene butadiene rubber (SBR) were mixed at a weight ratio of 95.3:1.5:1.2:2 in water as a solvent to prepare a negative electrode slurry. The prepared negative electrode slurry was applied to a copper (Cu) thin film as a negative electrode current collector having a thickness of about 65 μm, which was rolled, so as to have an electrode density of 1.6 g/cc by performing roll pressing, and dried to produce a negative electrode.

A polypropylene separator was interposed between each of the prepared negative electrodes and lithium metal as a counter electrode, and then an electrolyte was injected into the separator to manufacture a half cell, wherein the electrolyte was prepared by dissolving 1 M LiPF$_6$ in a solvent mixture prepared by adding 1 wt % of vinylene carbonate (VC) and 0.5 wt % of propane sultone (PS) in a solvent in which fluoroethylene carbonate (FEC), ethylene carbonate (EC), and ethyl methyl carbonate (EMC) were mixed at a volume ratio of 10:20:70.

<Evaluation of Lifespan Characteristics>

Each of the half-cells manufactured using the negative electrode active materials prepared in Examples 1 to 26 and Comparative Examples 1 to 4 was charged and discharged to evaluate the initial efficiency and the results are shown in Table 2 below.

Each manufactured battery was charged at a constant current (CC) of 0.1 C at 25° C. until the voltage reached 5 mV, and then, first charging was performed at a constant voltage (CV) until the charging current reached 0.005 C (cut-off current). Afterward, each battery was allowed to stand for 20 minutes and discharged at a constant current (CC) of 0.1 C until the voltage reached 1.5 V to confirm the initial efficiency. Thereafter, second charging and discharging was performed at 0.1 C, and then, charging and discharging was repeated at 0.5 C up to 50 cycles to evaluate the capacity retention rate.

TABLE 2

| | Doping element and content (M, wt %) | Content of carbon coating layer (wt %) | Solid-phase condensation temperature (° C.) | Amorphous Content (wt %) | Initial discharge capacity (mAh) | Initial efficiency (%) | Lifespan characteristics (@ 50 cycles) |
|---|---|---|---|---|---|---|---|
| Example 1 | Li, 1 | 4 | 500 | 68 | 1,510 | 75.2 | 91.8 |
| Example 2 | Li, 2 | 5 | 500 | 66 | 1,485 | 77.1 | 92 |
| Example 3 | Li, 3 | 4 | 500 | 63 | 1,452 | 78.4 | 91.6 |
| Example 4 | Li, 10 | 4 | 500 | 54 | 1,387 | 85.2 | 95.7 |
| Example 5 | Li, 20 | 5 | 500 | 36 | 1,243 | 90.9 | 94.1 |
| Example 6 | Li, 30 | 5 | 500 | 21 | 1,081 | 97.7 | 91 |
| Example 7 | Mg, 1 | 5 | 500 | 67 | 1,507 | 74.9 | 93.5 |
| Example 8 | Mg, 2 | 4 | 500 | 63 | 1,472 | 76.5 | 93.2 |

TABLE 2-continued

| | Doping element and content (M, wt %) | Content of carbon coating layer (wt %) | Solid-phase condensation temperature (° C.) | Amorphous Content (wt %) | Initial discharge capacity (mAh) | Initial efficiency (%) | Lifespan characteristics (@ 50 cycles) |
|---|---|---|---|---|---|---|---|
| Example 9 | Mg, 3 | 4 | 500 | 59 | 1,448 | 77.8 | 96.3 |
| Example 10 | Mg, 10 | 5 | 500 | 52 | 1,371 | 84.4 | 95.9 |
| Example 11 | Mg, 20 | 5 | 500 | 37 | 1,239 | 89.2 | 95.8 |
| Example 12 | Mg, 30 | 5 | 500 | 23 | 1,066 | 95.3 | 91.5 |
| Example 13 | Li, 10 | 4 | 350 | 70 | 1,298 | 83.1 | 91.1 |
| Example 14 | Li, 10 | 5 | 400 | 68 | 1,352 | 83.8 | 92.1 |
| Example 15 | Li, 10 | 4 | 450 | 62 | 1,377 | 84.9 | 91.8 |
| Example 16 | Li, 10 | 5 | 550 | 46 | 1,388 | 85.3 | 94.4 |
| Example 17 | Li, 10 | 5 | 600 | 39 | 1,372 | 85.1 | 94.1 |
| Example 18 | Li, 10 | 4 | 750 | 31 | 1,375 | 84.9 | 92.1 |
| Example 19 | Li, 10 | 4 | 800 | 32 | 1,363 | 82.7 | 89.8 |
| Example 20 | Mg, 10 | 5 | 350 | 69 | 1,343 | 82.6 | 91.5 |
| Example 21 | Mg, 10 | 5 | 400 | 66 | 1,365 | 83.8 | 91.9 |
| Example 22 | Mg, 10 | 6 | 450 | 61 | 1,369 | 84.3 | 93 |
| Example 23 | Mg, 10 | 4 | 550 | 44 | 1,373 | 84.2 | 94.9 |
| Example 24 | Mg, 10 | 6 | 600 | 38 | 1,365 | 84.3 | 93.1 |
| Example 25 | Mg, 10 | 6 | 750 | 29 | 1,370 | 83.6 | 91.5 |
| Example 26 | Mg, 10 | 5 | 800 | 21 | 1,357 | 82.7 | 91.2 |
| Comparative Example 1 | Li, 10 | 5 | 320 | 72 | 1,085 | 78.1 | 74.5 |
| Comparative Example 2 | Li, 10 | 6 | 850 | 18 | 1,124 | 79.6 | 79.7 |
| Comparative Example 3 | Mg, 10 | 4 | 310 | 73 | 1,077 | 77.9 | 76.6 |
| Comparative Example 4 | Mg, 10 | 4 | 840 | 19 | 1,131 | 78.1 | 80.3 |

Referring to Table 2, it was confirmed that the half-cells manufactured using the negative electrode active materials prepared in Examples 1 to 26 exhibited significantly superior lifespan characteristics compared to the half-cell manufactured using the negative electrode active materials prepared in Comparative Examples 1 to 4. Further, the initial efficiency was increased as the content of the doping element was increased, and more excellent lifespan characteristics were exhibited when the content of the amorphous phase of the silicon-based particles satisfies a certain range, specifically, the range of 20 wt % to 70 wt %, more specifically 30 wt % to 60 wt % based upon a total weight of the M-SiO$_x$.

The invention claimed is:

1. A negative electrode active material for a lithium secondary battery, comprising:
   a silicon-based particle represented by M-SiO$_x$, wherein the M is Mg, and 0≤x<2; and
   a carbon coating layer on a surface of the silicon-based particle;
   wherein the M-SiO$_x$ comprises a crystalline phase and an amorphous phase,
   wherein the amorphous phase is present in an amount of 37 wt % to 52 wt % based upon a total weight of the M-SiO$_x$,
   wherein the silicon-based particle comprises the M in an amount of 10 wt % to 20 wt % based on a total weight of the M SiO$_x$, and
   wherein the carbon coating layer is included in an amount of 4 wt % to 5 wt % based on a total weight of the negative electrode active material.

2. The negative electrode active material of claim 1, wherein the crystalline phase comprises one or more selected from the group consisting of a Si phase, a SiO$_2$ phase, a metal oxide phase, and a metal silicate phase.

3. A negative electrode for a lithium secondary battery comprising the negative electrode active material according to claim 1.

4. A lithium secondary battery comprising the negative electrode according to claim 3.

5. A method of preparing the negative electrode active material according to claim 1, the method comprising:
   vacuum-heating a powder mixture of Si and SiO$_2$ to form SiO$_x$ vapor, wherein 0≤x<2;
   vacuum-heating a metal M to form M vapor, wherein the M is Mg;
   mixing the SiO$_x$ vapor and the M vapor to form a mixture;
   solid-phase condensing the mixture of SiO$_x$ vapor and the M vapor to form the M-SiO$_x$; and forming the carbon coating layer on the surface of the M-SiO$_x$ after solid-phase condensing the mixture of SiO$_x$ vapor and the M vapor,
   wherein the solid-phase condensing process comprises a step of controlling a temperature to adjust an amorphous phase content of the M-SiO$_x$ to a range of 37 wt % to 52 wt % based upon a total weight of the M-SiO$_x$,
   wherein the silicon-based particle comprises M present in an amount of 10 wt % to 20 wt % based on a total weight of the silicon-based particle, and
   wherein the carbon coating layer is included in an amount of 4 wt % to 5 wt % based on a total weight of the negative electrode active material.

6. The method of claim 5, wherein the temperature in the solid-phase condensing process is controlled in a range of 340° C. to 810° C.

7. The method of claim 5, wherein the temperature in the solid-phase condensing process is controlled in a range of 400° C. to 750° C.

8. The method of claim 5, wherein the carbon coating layer is formed by carbonizing a carbon precursor.

* * * * *